US008061603B2

(12) United States Patent
Connell, II et al.

(10) Patent No.: US 8,061,603 B2
(45) Date of Patent: Nov. 22, 2011

(54) CONTROLLING SHOPPER CHECKOUT THROUGHPUT

(75) Inventors: Jonathan H. Connell, II, Cortlandt-Manor, NY (US); Myron D. Flickner, San Jose, CA (US); Norman Haas, Mount Kisco, NY (US); Arun Hampapur, Norwalk, CT (US); Charles A. Otto, Hawthorne, NY (US); Sharathchandra U. Pankanti, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/052,051

(22) Filed: Mar. 20, 2008

(65) Prior Publication Data

US 2009/0236419 A1 Sep. 24, 2009

(51) Int. Cl.
*G06K 15/00* (2006.01)
(52) U.S. Cl. .......................................................... 235/383
(58) Field of Classification Search .................. 235/383; 73/1.13; 382/100
See application file for complete search history.

(56) References Cited

U.S. PATENT DOCUMENTS 4,323,772 A 4/1982 Serge
5,331,455 A 7/1994 Chang
5,426,282 A 6/1995 Humble
5,467,403 A 11/1995 Fishbine et al.
5,477,379 A 12/1995 Chang
5,497,314 A * 3/1996 Novak ............................ 705/17
5,513,264 A 4/1996 Wang et al.
5,546,475 A 8/1996 Bolle et al.
5,583,686 A 12/1996 Chen
5,609,223 A 3/1997 Iizaka et al.
5,631,976 A 5/1997 Bolle et al.
5,635,697 A 6/1997 Shellhammer et al.
5,649,970 A 7/1997 Loeb et al.
5,659,167 A 8/1997 Wang et al.
5,763,864 A 6/1998 O'Hagen et al.
5,811,774 A 9/1998 Ju et al.

(Continued)

FOREIGN PATENT DOCUMENTS

WO 0225506 3/2002

(Continued)

OTHER PUBLICATIONS

Bolle et al., "Veggie Vision: A Produce Recognition System", pp. 1-4, WACV 1996.

(Continued)

*Primary Examiner* — Seung Lee
*Assistant Examiner* — Sonji Johnson
(74) *Attorney, Agent, or Firm* — Anna L. Linne; Hoffman Warnick LLC

(57) ABSTRACT

The present invention provides a solution for controlling checkout throughput. Specifically, under the present invention a set of attributes of an item will be obtained. An analysis of the set of attributes will then be performed to determine whether an inconsistency exists based on a tolerance threshold. Such analysis can include, for example, comparing the weight of the item to its expected weight. This can help determine if a mistake has been made or fraud has been committed. Whether an inconsistency is observed is based on a tolerance threshold. For example, a certain deviation (i.e., the tolerance threshold) from an expected value could be allowed to could be allowed to reduce errors during the checkout process and thereby increase checkout throughput. As such, the present invention allows the tolerance threshold to be tuned based on a desired checkout throughput.

13 Claims, 5 Drawing Sheets

U.S. PATENT DOCUMENTS

| | | | | |
|---|---|---|---|---|
| 5,815,200 | A | 9/1998 | Ju et al. | |
| 5,883,968 | A * | 3/1999 | Welch et al. | 382/100 |
| 5,918,211 | A | 6/1999 | Sloane | |
| 6,005,959 | A | 12/1999 | Mohan et al. | |
| 6,032,128 | A * | 2/2000 | Morrison et al. | 705/23 |
| 6,064,469 | A | 5/2000 | Brownstein | |
| 6,122,409 | A | 9/2000 | Boggs et al. | |
| 6,287,299 | B1 | 9/2001 | Sasnett et al. | |
| 6,310,964 | B1 | 10/2001 | Mohan et al. | |
| 6,366,696 | B1 | 4/2002 | Hertz et al. | |
| 6,382,357 | B1 | 5/2002 | Morrison et al. | |
| 6,434,530 | B1 | 8/2002 | Sloane et al. | |
| 6,504,481 | B2 | 1/2003 | Teller | |
| 6,556,276 | B2 | 4/2003 | Staeheli et al. | |
| 6,606,171 | B1 | 8/2003 | Renk et al. | |
| 6,726,094 | B1 | 4/2004 | Rantze et al. | |
| 6,853,400 | B1 | 2/2005 | Matama | |
| 6,991,158 | B2 | 1/2006 | Munte | |
| 7,044,370 | B2 | 5/2006 | Bellis et al. | |
| 7,118,026 | B2 | 10/2006 | Harris et al. | |
| 7,124,058 | B2 | 10/2006 | Namaky et al. | |
| 7,159,770 | B2 | 1/2007 | Onozu | |
| 7,168,618 | B2 | 1/2007 | Schwartz | |
| 7,196,624 | B2 | 3/2007 | Teller | |
| 7,202,780 | B2 | 4/2007 | Teller | |
| 7,334,729 | B2 | 2/2008 | Brewington | |
| 7,337,960 | B2 * | 3/2008 | Ostrowski et al. | 235/383 |
| 7,422,147 | B2 | 9/2008 | Rosenbaum | |
| 2001/0045463 | A1 | 11/2001 | Madding et al. | |
| 2002/0004404 | A1 | 1/2002 | Squibbs | |
| 2002/0013837 | A1 | 1/2002 | Battat et al. | |
| 2002/0070861 | A1 | 6/2002 | Teller | |
| 2002/0110374 | A1 | 8/2002 | Staeheli et al. | |
| 2002/0121547 | A1 | 9/2002 | Wieth et al. | |
| 2002/0161658 | A1 | 10/2002 | Sussman | |
| 2002/0194074 | A1 | 12/2002 | Jacobs | |
| 2003/0024982 | A1 * | 2/2003 | Bellis et al. | 235/383 |
| 2003/0071725 | A1 | 4/2003 | Teller | |
| 2003/0167242 | A1 | 9/2003 | Hamilton | |
| 2004/0125396 | A1 | 7/2004 | Burke | |
| 2005/0096855 | A1 | 5/2005 | Teller | |
| 2005/0173527 | A1 | 8/2005 | Conzola | |
| 2005/0189411 | A1 * | 9/2005 | Ostrowski et al. | 235/383 |
| 2005/0189412 | A1 | 9/2005 | Hudnut et al. | |
| 2005/0200490 | A1 | 9/2005 | Teller | |
| 2005/0211771 | A1 | 9/2005 | Onozu | |
| 2005/0237213 | A1 | 10/2005 | Teller | |
| 2006/0010033 | A1 | 1/2006 | Thomas | |
| 2006/0032915 | A1 | 2/2006 | Schwartz | |
| 2006/0047835 | A1 | 3/2006 | Greaux | |
| 2006/0161390 | A1 | 7/2006 | Namaky et al. | |
| 2006/0179164 | A1 | 8/2006 | Katibian et al. | |
| 2006/0288133 | A1 | 12/2006 | Katibian et al. | |
| 2006/0289637 | A1 | 12/2006 | Brice et al. | |
| 2006/0290980 | A1 | 12/2006 | Terada | |
| 2007/0107016 | A1 | 5/2007 | Angel et al. | |
| 2007/0107017 | A1 | 5/2007 | Angel et al. | |
| 2007/0107021 | A1 | 5/2007 | Angel et al. | |
| 2007/0279244 | A1 | 12/2007 | Haughawout et al. | |
| 2008/0027796 | A1 | 1/2008 | Chaves | |
| 2008/0059281 | A1 | 3/2008 | Tower et al. | |
| 2008/0141755 | A1 * | 6/2008 | Edwards | 73/1.13 |
| 2008/0142598 | A1 * | 6/2008 | Kwan | 235/462.41 |
| 2008/0149725 | A1 * | 6/2008 | Rosenbaum | 235/462.41 |
| 2009/0119168 | A1 | 5/2009 | Otto et al. | |

FOREIGN PATENT DOCUMENTS

WO 0225506 A1 3/2002

OTHER PUBLICATIONS

Derwent, "Web Based Ordering System for Non-Standardised Goods e.g. Fruit, Vegetables Provides View of Item for Selection and Prints Bar Code on Item for Order Processing", Jul. 10, 1998, 2 pages.

Connell II, "Item Scanning System", U.S. Appl. No. 11/782,173, filed Jul. 24, 2007.

Connell II, Office Action Communication, U.S. Appl. No. 11/782,173, May 27, 2009, 12 pages.

Connell II, Office Action Communication, U.S. Appl. No. 11/782,173, Nov. 27, 2009, 12 pages.

Connell II, Office Action Communication, U.S. Appl. No. 11/782,177, Nov. 24, 2009, 16 pages.

Connell II, Office Action Communication, U.S. Appl. No. 12/052,051, Jun. 26, 2009, 19 pages.

Connell II, Office Action Communication, U.S. Appl. No. 12/052,051, Sep. 8, 2008, 19 pages.

Connell II, Office Action Communication, U.S. Appl. No. 11/756,391, Dec. 2, 2008, 19 pages.

Reesen, Rick, "Virtual World Technologies to Manage a Grid—A Look at Some Realities, Concepts and Maybe Even the Future", Virtual Universe Community, Apr. 2, 2008, pp. 1-19.

Sahai, Akhil, "Towards Distributed and Dynamic Network Management", Network Operations and Management Symposium, vol. 2, Feb. 15, 1998, pp. 455-464.

Bolle, "Veggie Vision: A Produce Recognition System", Produce Marketing Association, 8 pages.

Connell II et al., U.S. Appl. No. 12/052,046, Office Action Communication, Apr. 2, 2010, 13 pages.

Connell II, et al., U.S. Appl. No. 11/782,177, Final Office Action, Apr. 23, 2010, 18 pages.

Connell II, et al. U.S. Appl. No. 11/782,173, Examiner's Answer, Apr. 30, 2010, 11 pages.

Connell II, et al. U.S. Appl. No. 11/756,391, Final Office Action, May 6, 2010, 18 pages.

Hai, U.S. Appl. No. 12/037,270, Office Action Communication, Aug. 6, 2010, 19 pages.

Kim, U.S. Appl. No. 11/756,382, Office Action Communication, Sep. 29, 2010, 26 pages.

Stanford, U.S. Appl. No. 12/112,318, Office Action Communication, Nov. 8, 2010, 20 pages.

Crosland, U.S. Appl. No. 12/052,046, Notice of Allowance & Fees Due, Oct. 7, 2010, 14 pages.

Basit, U.S. Appl. No. 12/037,270, Office Action Communication, Jan. 21, 2011, 13 pages.

Vo, U.S. Appl. No. 12/037,266, Office Action Communication, Jan. 27, 2011, 31 pages.

Kim, U.S. Appl. No. 11/756,382, Notice of Allowance & Fees Due, Mar. 24, 2011, 11 pages.

Stanford, U.S. Appl. No. 12/112,318, Office Action Communication, May 3, 2011, 16 pages.

Basit, U.S. Appl. No. 12/037,270, Office Action Communication, Jun. 15, 2011, 22 pages.

Mehta, "Delta Adds Fee to Tickets Not Bought Online; Airlines: The $2 charge applies to all round-trip domestic flights not booked through its Web site. Travel agens criticize the move." Los Angeles Times, Jan. 14, 1999, ProQuest LLC, 3 pages.

Vo, U.S. Appl. No. 12/037,266, Office Action Communication, Jul. 22, 2011, 18 pages.

* cited by examiner

CONTROLLING SHOPPER CHECKOUT THROUGHPUT

CROSS-REFERENCE TO RELATED APPLICATION

This application is related in some aspects to the commonly owned and co-pending application entitled “Portable Device-Based Shopping Checkout,” filed on May 31, 2007, and which is assigned U.S. patent application Ser. No. 11/756,382, the entire contents of which are herein incorporated by reference. This application is related in some aspects to the commonly owned and co-pending application entitled “Item Scanning System,” filed on Jul. 24, 2007, and which is assigned U.S. patent application Ser. No. 11/782,173, the entire contents of which are herein incorporated by reference.

BACKGROUND OF THE INVENTION

Shopping checkout (e.g., retail supermarket, etc.) is a process by which most everyone is familiar. Typical checkout involves a shopper navigating about a store collecting items/items for purchase. Often the shopper will utilize a shopping receptacle such as a shopping cart and/or shopping basket. Upon completion of gathering the desired items, the shopper will proceed to a checkout station for checkout (e.g., bagging and payment). In recent years, many stores have become equipped with self-checkout stations whereby a shopper will scan and bag the items his/herself, and then make payment via the self-checkout station.

One long standing concern of store owners is shopper throughput (e.g., how quickly shoppers move) through the checkout processes (whether self-checkout or traditional checkout stations are implemented). Specifically, long lines, long waits, etc. can greatly add to shopper dissatisfaction with a particular store/shopping venue. These waits are compounded by various errors at checkout stations and/or the need for store employee intervention. In view of the foregoing there exists a need for a solution that solves at least one of the deficiencies of the related art.

SUMMARY OF THE INVENTION

The present invention provides a solution for controlling checkout throughput. Specifically, under the present invention a set of attributes of an item will be obtained. Such attributes can include, for example, an identity of the item, an appearance of the item, a physical dimension of the item, a price of the item, and a weight of the item, etc. An analysis of the set of attributes will then be performed to determine whether an inconsistency exists based on a tolerance threshold. Such analysis can include, for example, comparing the weight of the item to its expected weight. This can help determine if a mistake has been made or fraud has been committed. Whether an inconsistency is observed is based on a tolerance threshold. For example, a certain deviation (i.e., the tolerance threshold) from an expected value could be allowed to could be allowed to reduce errors during the checkout process and thereby increase checkout throughput. As such, the present invention allows the tolerance threshold to be tuned based on a desired checkout throughput.

A first aspect of the present invention provides a method for controlling a checkout throughput, comprising: obtaining a set of attributes of an item; analyzing the set of attributes to determine whether an inconsistency exists based on a tolerance threshold; and tuning the tolerance threshold based on a desired checkout throughput.

A second aspect of the present invention provides a system for tuning a tolerance threshold for shopping checkout, comprising: a module for obtaining a set of attributes of an item; a module for analyzing the set of attributes to determine whether an inconsistency exists based on a tolerance threshold; and a module for tuning the tolerance threshold based on a desired checkout throughput.

A third aspect of the present invention provides a program product stored on a computer readable medium for tuning a tolerance threshold for shopping checkout, the computer readable medium comprising program code for causing a computer system to: obtain a set of attributes of an item; analyze the set of attributes to determine whether an inconsistency exists based on a tolerance threshold; and tune the tolerance threshold based on a desired checkout throughput.

A fourth aspect of the present invention provides a method for deploying a system for tuning a tolerance threshold for shopping checkout, comprising: providing a computer infrastructure being operable to: obtain a set of attributes of an item; analyze the set of attributes to determine whether an inconsistency exists based on a tolerance threshold; and tune the tolerance threshold based on a desired checkout throughput.

A fifth aspect of the present invention provides a data processing system for tuning a tolerance threshold for shopping checkout, comprising: a memory medium having instructions; a bus coupled to the memory medium; and a processor coupled to the bus that when executing the instructions causes the data processing system to: obtain a set of attributes of an item, analyze the set of attributes to determine whether an inconsistency exists based on a tolerance threshold, and tune the tolerance threshold based on a desired checkout throughput.

A sixth aspect of the present invention provides a method for controlling a checkout throughput, comprising: obtaining a set of attributes of an item; analyzing the set of attributes to determine whether an inconsistency exists based on a tolerance threshold; and tuning the tolerance threshold based on a desired checkout throughput.

BRIEF DESCRIPTION OF THE DRAWINGS

These and other features of this invention will be more readily understood from the following detailed description of the various aspects of the invention taken in conjunction with the accompanying drawings in which.

Figure 1:
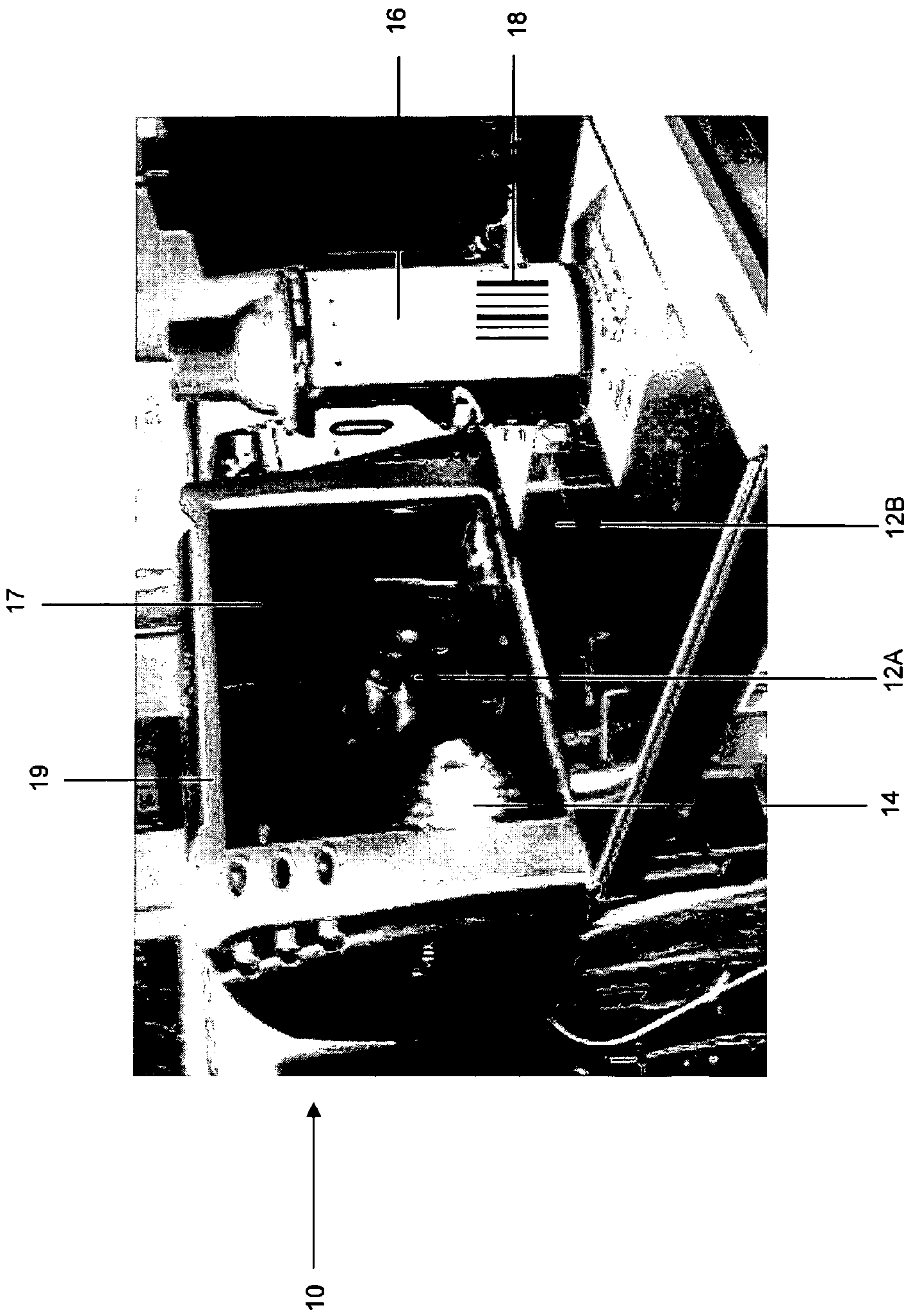
FIG. 1 depicts a checkout station according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description

II. Computerized Implementation

I. General Description

As used herein, the following terms have the associated meanings:

"Set"—a quantity of at least one.

"Shopping Receptacle"—any container capable of holding items such as a shopping cart, a shopping basked, a shopping bag, etc.

"Image Capture Device"—means any type of camera or the like such as a still image camera, a video camera, etc.

As indicated above, the present invention provides a solution for controlling checkout throughput. Specifically, under the present invention a set of attributes of an item will be obtained. Such attributes can include, for example, an identity of the item, an appearance of the item, a physical dimension of the item, a price of the item, and a weight of the item, etc. An analysis of the set of attributes will then be performed to determine whether an inconsistency exists based on a tolerance threshold. Such analysis can include, for example, comparing the weight of the item to its expected weight. This can help determine if a mistake has been made or fraud has been committed. Whether an inconsistency is observed is based on a tolerance threshold. For example, a certain deviation (i.e., the tolerance threshold) from an expected value could be allowed to could be allowed to reduce errors during the checkout process and thereby increase checkout throughput. As such, the present invention allows the tolerance threshold to be tuned based on a desired checkout throughput.

Referring now to FIG. 1, an item scanning system/checkout station 10 according to one embodiment of the present invention is shown. In general, item scanning system 10 comprises an integrated scanning and image capture system. Specifically, item scanning system 10 includes at least one barcode scanner 12A and/or 12B, at least one image capture device(s) 14 (e.g., a still image camera, a video camera, etc.), and image scanning software (e.g., that can include barcode scanning and image processing software) (shown in FIG. 5). At least one barcode scanner 12A and one image capture mechanism 14 of item scanning system 10 are positioned within a common enclosure 19.

Image capture device(s) 14 is placed behind shield 17 (glass, plastic, etc.) as shown. Where multiple image capture devices 14 are used, one is placed so that it looks out along a path more or less normal to the vertical glass surface of the barcode scanner, and the other looks more or less straight up from below the horizontal surface of the scanner. The latter image capture device also can be placed off to one side, so that it is actually under the (e.g., steel) rim surrounding the existing shield 17 in that surface. As such, a hole (e.g., 1" in diameter in an illustrative embodiment) is cut in the steel rim, and covered with a separate, transparent plate. Regardless (as stated above), item scanning system 10 also includes barcode scanning and image processing software to perform the functions described herein. This software is stored on a memory medium that may or may not be positioned within enclosure.

Figure 2:
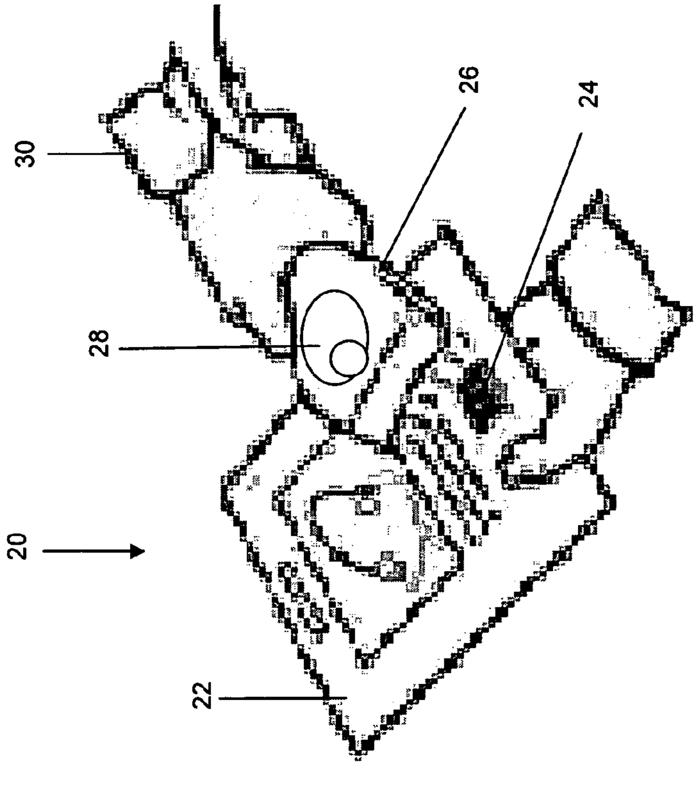
FIG. 2 depicts a hand-held scanner according to another embodiment of the present invention.

Referring now to FIG. 2, an item scanning system 20 according to another embodiment of the present invention is shown. In general, item scanning system 20 comprises handheld barcode scanner (hereinafter handheld scanner 26), at least one image capture device 28 (e.g., a still image camera, a video camera, etc.) that is collocated with handheld scanner 26, and image scanning software (shown in FIG. 5).

The functions of item scanning systems 10 and 20 are now explained in greater detail with reference to FIGS. 1 and 2 collectively. Specifically, when an item 16 and/or 22 is presented at checkout, a checkout clerk 30 will generally attempt to scan a barcode 18 and 24 of item 16 and 22. Whether or not barcode 18 and 24 is present, image capture device 14 and 28 will capture an appearance of item 16 and 22.

Figure 4:
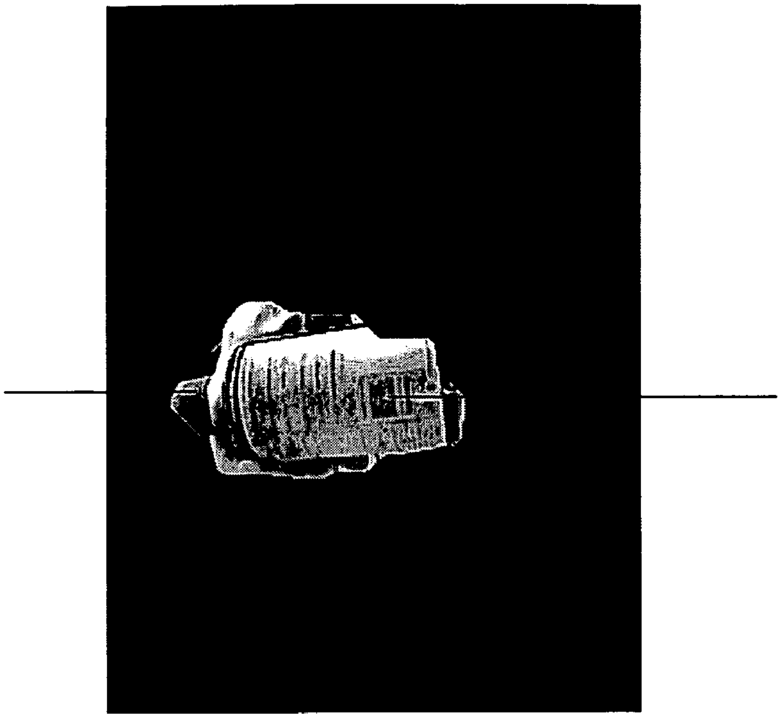
FIG. 4 depicts an item after being processed according to an embodiment of the present invention.
Figure 3:
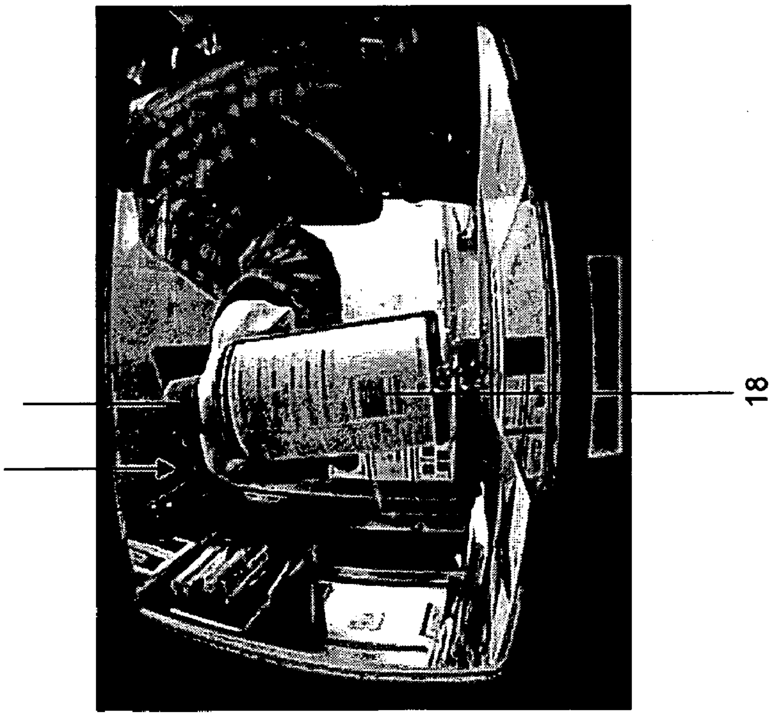
FIG. 3 depicts an item before being processed according to an embodiment of the present invention.

The sequence of capturing and processing the image is shown in FIGS. 3-4 with respect to item 16, and typically is as follows: wait for low motion of item 16; take dark and bright pictures; segment item 16 from background 20, the results of which are shown in FIG. 4; extract at least one visual feature of item 16 and determine the identity based on those visual features. This determination can be based on comparison of the image to an electronic database or library of images associated with corresponding item identities. In addition, the appearance can be as general or as specific as desired. For example, the appearance can be specific so as to identify the item (e.g., a bottle of X brand cola), or it can be more general (e.g., a bottle of cola, or just cola based on the color).

Figure 5A:
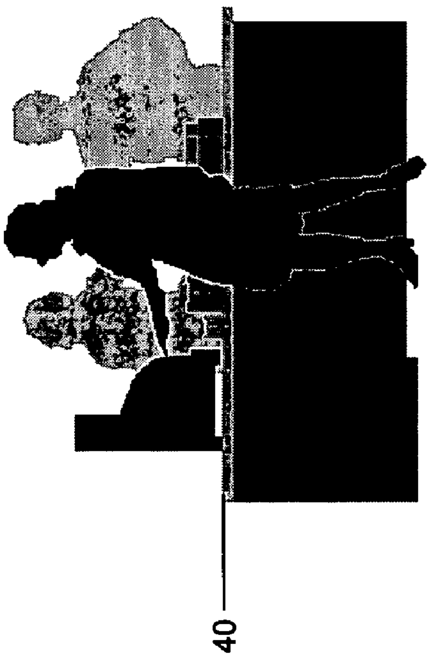
FIGS. 5A-B depicts scales used at checkout stations according to an embodiment of the present invention.
Figure 5B:
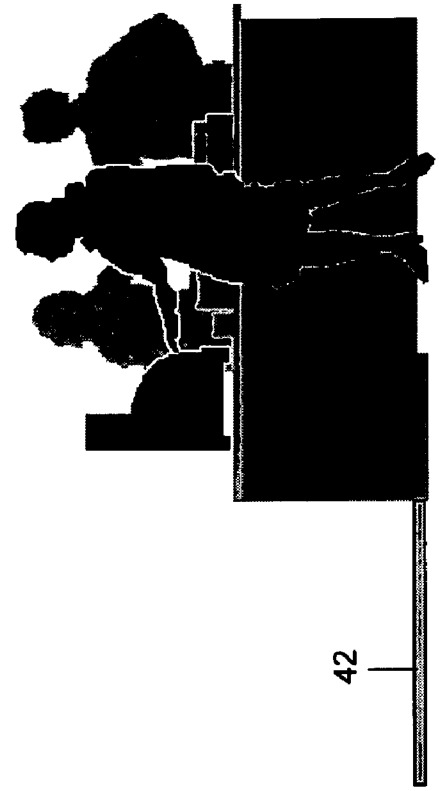

Thereafter, item scanning system 10 will (via a search engine) search a database of items to identify a set of items that potentially match the scanned item 16 and 22 based on the appearance (after processing as explained above). This search can be supplemented based on at least one of the following: a weight of the item, an approximate weight of the item, an approximate appearance of the item, approximate dimensions of the item, a description of the item, a functionality of the item, and a set of retail departments to which the item corresponds. These items can be determined automatically (e.g., by a scale), or can be manually input by an individual 30 (FIG. 2). For example, as shown in FIGS. 5A-B, scales 40-42 can be used at checkout stations to determine a weight of an item or of an entire shopping receptacle.

It should be understood that the capturing of an image of an item can be performed whether or not a barcode is present. Whether or not a barcode is not present, the image capture and subsequent processing can be performed not only to identify an item without having to obtain a barcode, but also as a measure against fraud or mistake. Still yet, when a barcode is not present, the item scanning software can be configured to provide (e.g., print out) a barcode.

The present invention has the capability to prevent mistake or fraud by making various comparisons of attributes of the items being scanned. For example, the present invention can compare the identity of the item as determined from the barcode scan to its appearance to determine if the two are consistent with one another. Similarly set of attributes of the item that can be cross-compared for consistency can include a physical dimension of the item, a price of the item, and a weight of the item, a weight or a group of items, etc. Discrepancies beyond a certain accepted tolerance (i.e., tolerance threshold) can give rise to errors that require human employee intervention. For example, if an item scans as a bottle of cola, but has the weight and/or appearance of a computer printer, mistake or fraud is occurring.

The degree of discrepancy that is allowed is referred to as a tolerance threshold. There may be times where a slight discrepancy is permitted to allow for slight errors or standard deviations. This is especially the case where the store is busy and checkout throughput is important to avoid customer dissatisfaction. For example, if a can of cola is supposed to weigh 12.4 ounces, and its actual weight is 12.5 ounces, the store might allow for the error to occur and checkout to continue unabated. However, if a tolerance threshold is set at 0.3 ounces, and the can actually weighs in at 12.9 ounces, an error would be registered.

The present invention allows the tolerance threshold to be automatically tuned based on a desired customer throughput. For example, if the store wishes to process X customers per hour. The present invention will determine how to tune (increase or decrease) the tolerance threshold to ensure that that desired throughput is met. That is, the inconsistency being realized when any of the set of attributes differs from its expected value by more than the tolerance threshold.

II. Computerized Implementation

Figure 6:
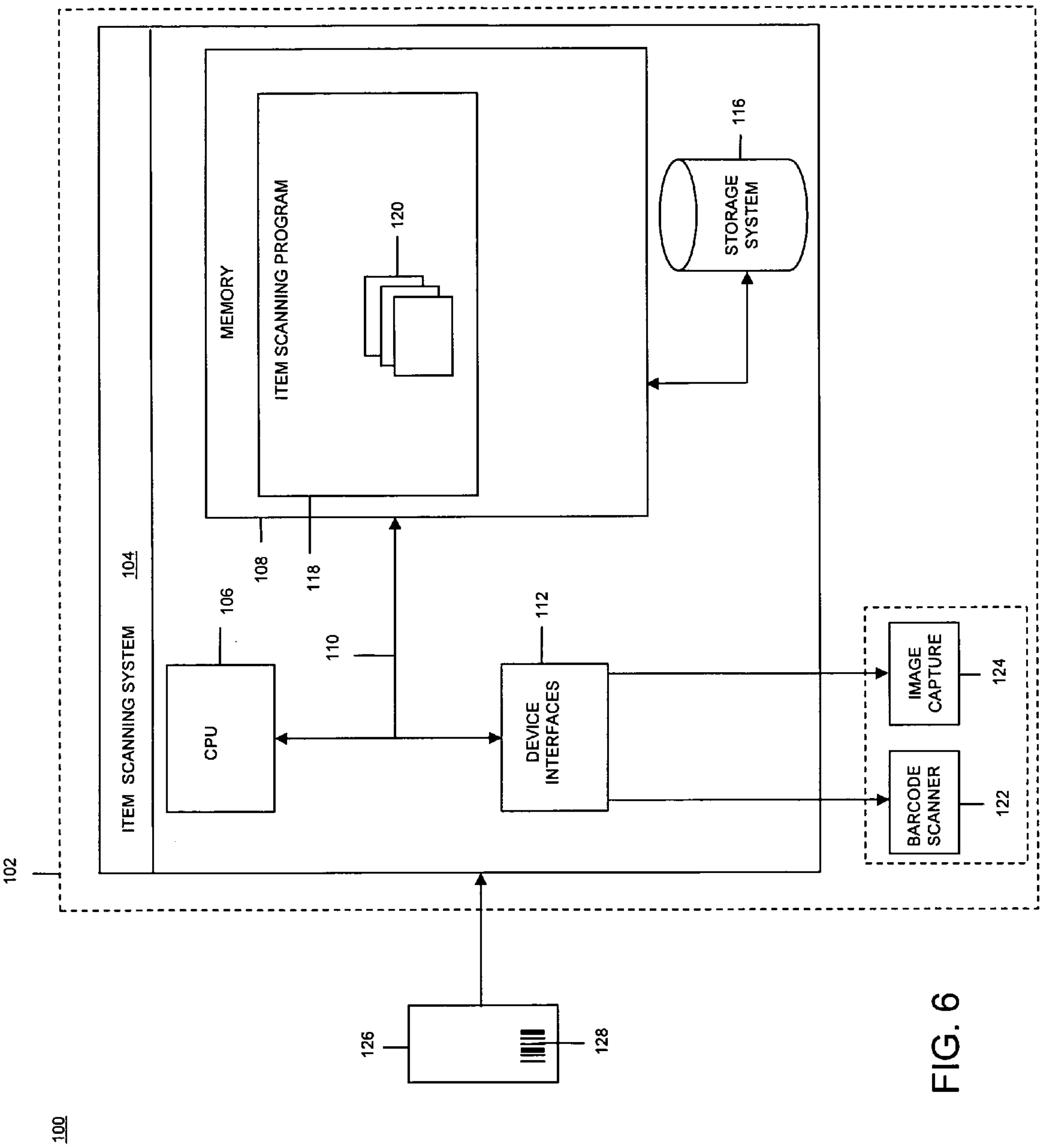
FIG. 6 depicts a more specific computerized implementation according to the present invention.

Referring now to FIG. 6, a computerized implementation 100 of the present invention is shown. As depicted, implementation 100 includes item scanning system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, item scanning system 104 of implementation 100 includes a processing unit 106, a memory 108, a bus 110, and device interfaces 112. Further, implementation 100 is shown having barcode scanner 122 and image capture device 124, and storage system 116. Barcode scanner 122 and 124 can be positioned proximate one another as shown, attached to one another, and/or contained within a common as shown in phantom. In general, processing unit 106 executes computer program code, such as item scanning program 118 having modules 120 that provide the functionality described herein, which are stored in memory 108 and/or storage system 116. While executing computer program code, processing unit 106 can read and/or write data to/from memory 108, storage system 116, and/or device interfaces 112. Bus 110 provides a communication link between each of the components in item scanning system 104. Although not shown, item scanning system 104 could also include I/O interfaces that communicate with: one or more external devices such as a cash register, a keyboard, a scale, a pointing device, a display, etc.); one or more devices that enable a user to interact with item scanning system 104; and/or any devices (e.g., network card, modem, etc.) that enable item scanning system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, item scanning system 104 is only representative of various possible computer systems that can include numerous combinations of hardware. To this extent, in other embodiments, item scanning system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 6 can be included in item scanning system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into item scanning system 104.

Shown in memory 108 of item scanning system 104 is item scanning program 118, which includes a set (at least one) of modules 120. The modules generally provide the functions of the present invention as described herein. Specifically (among other things), set of modules 120 are configured to: obtain a set of attributes of an item; analyze the set of attributes to determine whether an inconsistency exists based on a tolerance threshold; and tune (increase or decrease) the tolerance threshold based on a desired checkout throughput to control the same.

While shown and described herein as an approach to control shopper checkout throughput it is understood that aspects of the invention further provide various alternative embodiments. For example, in one embodiment, the invention provides a computer-readable/useable medium that includes computer program code to enable a computer infrastructure to control shopper checkout throughput. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide item scanning. In this case, the service provider can create, maintain, and support, etc., a computer infrastructure, such as computer infrastructure 102 (FIG. 6) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for item scanning. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as item scanning system 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or data processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for controlling a checkout throughput, comprising:

capturing an image of an item with an image capture device, wherein the capturing includes waiting for a low motion of the item, taking dark and bright images of the item and using the dark and bright images to segment the item from a background to obtain a captured image of the item;

scanning a barcode of the item with a scanning device; wherein the image capture device and the scanning device are adjacent to each other and are both positioned within a common enclosure and the item is positioned outside the common enclosure;

processing the image to capture an appearance of the item; wherein the processing includes extracting at least one visual feature;

searching a database of items to determine an identity of the item and a set of expected attributes of the item, based on the captured image barcode, wherein the set of expected attributes includes at least one of: an expected identity of the item, an expected appearance of the item, an expected physical dimension of the item, an expected price of the item, and an expected weight of the item;

obtaining a set of actual attributes for the item, wherein the obtaining is performed by at least one of: a scale, a user input, and the barcode scan;

analyzing the set of actual attributes and the set of expected attributes to determine whether an inconsistency exists; wherein an inconsistency exists when the set of actual attributes differs from the expected set of attributes by more than a tolerance threshold; and automatically and dynamically tuning the tolerance threshold based on a desired checkout throughput, wherein the tuning comprises increasing the tolerance threshold in the case that an actual checkout throughput is greater than the desired checkout throughput, and decreasing the tolerance threshold in the case that the actual checkout throughput is less than the desired checkout throughput.

2. The method of claim 1, the expected and actual sets of attributes being selected from a group consisting of an identity of the item, an appearance of the item, a physical dimension of the item, a price of the item, and a weight of the item.

3. The method of claim 1, the method being performed at a checkout station.

4. The method of claim 1, the desired checkout throughput being based on at least one of the following: a waiting time of shoppers, a shopping pattern of the shoppers, or a type of business selling the item.

5. A system for tuning a tolerance threshold for shopping checkout, comprising:

an image capture module for capturing an image of an item, wherein the capturing includes waiting for a low motion of the item, taking dark and bright images of the item and using the dark and bright images to segment the item from a background to obtain a captured image of the item;

a scanning module for scanning a barcode of the item with a scanning device; wherein the image capture module and the scanning module are adjacent to each other and are both positioned within a common enclosure and the item is positioned outside the common enclosure;

a module for processing the image to capture an appearance of the item; wherein the processing includes extracting at least one visual feature;

a module for determining an identity of the item and a set of expected attributes of the item, based on the captured image, wherein the set of expected attributes includes at least one of: an expected identity of the item, an expected appearance of the item, an expected physical dimension of the item, an expected price of the item, and an expected weight of the item;

a module for obtaining a set of actual attributes for the item, wherein the obtaining is performed by at least one of: a scale, a user input, and the barcode scan;

a module for analyzing the set of actual attributes and the set of expected attributes to determine whether an inconsistency exists; wherein an inconsistency exists when the set of actual attributes differs from the expected set of attributes by more than a tolerance threshold; and a module for automatically and dynamically tuning the tolerance threshold based on a desired checkout throughput, wherein the tuning comprises increasing the tolerance threshold in the case that an actual checkout throughput is greater than the desired checkout throughput, and decreasing the tolerance threshold in the case that the actual checkout throughput is less than the desired checkout throughput.

6. The system of claim 5, the expected and actual sets of attributes being selected from a group consisting of an identity of the item, an appearance of the item, a physical dimension of the item, a price of the item, and a weight of the item.

7. The system of claim 5, the system being implemented at a shopping checkout station.

8. The system of claim 5, the desired shopper throughput being based on at least one of the following: a waiting time of shoppers, a shopping pattern of the shoppers, or a type of business selling the item.

9. A program product stored on a non-transitory computer readable medium for tuning a tolerance threshold for shopping checkout, the non-transitory computer readable medium comprising program code for causing a computer system to:

capture an image of an item with an image capture device, wherein the capturing includes waiting for a low motion of the item, taking dark and bright images of the item and using the dark and bright images to segment the item from a background to obtain a captured image of the item;

scan a barcode of the item with a scanning device; wherein the image capture device and the scanning device are adjacent to each other and are both positioned within a common enclosure and the item is positioned outside the common enclosure;

process the image to capture an appearance of the item; wherein the process includes extracting at least one visual feature;

determine an identity of the item and a set of expected attributes of the item, based on the captured image, wherein the set of expected attributes includes at least one of: an expected identity of the item, an expected appearance of the item, an expected physical dimension of the item, an expected price of the item, and an expected weight of the item;

obtain a set of actual attributes for the item, wherein the obtaining is performed by at least one of: a scale, a user input, and the barcode scan;

analyze the set of actual attributes and the set of expected attributes to determine whether an inconsistency exists; wherein an inconsistency exists when the set of actual attributes differs from the expected set of attributes by more than a tolerance threshold; and automatically and dynamically tune the tolerance threshold based on a desired checkout throughput, wherein the tuning comprises increasing the tolerance threshold in the case that an actual checkout throughput is greater than the desired checkout throughput, and decreasing the tolerance threshold in the case that the actual checkout throughput is less than the desired checkout throughput.

10. The program product of claim 9, the expected and actual sets of attributes being selected from a group consisting of an identity of the item, an appearance of the item, a physical dimension of the item, a price of the item, and a weight of the item.

11. The program product of claim 9, the program product being performed at a checkout station.

12. The program product of claim 9, the desired shopper throughput being based on at least one of the following: a waiting time of shoppers, a shopping pattern of the shoppers, or a type of business selling the item.

13. A method for deploying a system for tuning a tolerance threshold for shopping checkout, comprising:

providing a computer infrastructure being operable to:

capture an image of an item with an image capture device, wherein the capturing includes waiting for a low motion of the item, taking dark and bright images of the item and using the dark and bright images to segment the item from a background to obtain a captured image of the item;

scan a barcode of the item with a scanning device; wherein the image capture device and the scanning device are adjacent to each other and are both positioned within a common enclosure and the item is positioned outside the common enclosure;

process the image to capture an appearance of the item; wherein the process includes extracting at least one visual feature;

search a database of items to determine an identity of the item and a set of expected attributes of the item, based on the captured image wherein the set of expected attributes includes at least one of: an expected identity of the item, an expected appearance of the item, an expected physical dimension of the item, an expected price of the item, and an expected weight of the item;

obtain a set of actual attributes for the item, wherein the obtaining is performed by at least one of: a scale, a user input, and the barcode scan;

analyze the set of actual attributes and the set of expected attributes to determine whether an inconsistency exists; wherein an inconsistency exists when the set of actual attributes differs from the expected set of attributes by more than a tolerance threshold; and automatically and dynamically tune the tolerance threshold based on a desired checkout throughput, wherein the tuning comprises increasing the tolerance threshold in the case that an actual checkout throughput is greater than the desired checkout throughput, and decreasing the tolerance threshold in the case that the actual checkout throughput is less than the desired checkout throughput.

* * * * *